(12) United States Patent
Bodaghi

US006818683B2

(10) Patent No.: US 6,818,683 B2
(45) Date of Patent: Nov. 16, 2004

(54) APPARATUS FOR MANUFACTURING OPTICAL FIBER MADE OF SEMI-CRYSTALLINE POLYMER

(75) Inventor: Hassan Bodaghi, Kings Point, NY (US)

(73) Assignee: First Quality Fibers, LLC, Great Neck, NY (US)

( * ) Notice: Subject to any disclaimer, the term of this patent is extended or adjusted under 35 U.S.C. 154(b) by 24 days.

(21) Appl. No.: 09/952,380

(22) Filed: Sep. 15, 2001

(65) Prior Publication Data

US 2002/0114598 A1 Aug. 22, 2002

Related U.S. Application Data

(63) Continuation-in-part of application No. 09/728,447, filed on Dec. 1, 2000, now abandoned, which is a continuation-in-part of application No. 09/663,308, filed on Sep. 15, 2000, now abandoned.

(51) Int. Cl.$^7$ .................................................. G02B 6/00
(52) U.S. Cl. ........................ 523/201; 523/207; 523/210; 385/143
(58) Field of Search ............................. 425/66, 131.5, 425/464, 378.1, 378.2, 382.2; 385/142, 143, 141, 144, 145; 264/1.24, 1.29, 211.12; 523/201, 207, 210, 211

(56) References Cited

U.S. PATENT DOCUMENTS

| | | | |
|---|---|---|---|
| 2,289,860 A | | 7/1942 | Babcock ................. 264/211.17 |
| 3,621,088 A | * | 11/1971 | Hatcher et al. ................ 264/78 |
| 3,849,241 A | | 11/1974 | Butin et al. .................. 428/137 |
| 4,017,249 A | | 4/1977 | Lenk ......................... 425/382.2 |
| 4,045,534 A | | 8/1977 | Fisher et al. ................. 264/237 |
| 4,115,989 A | | 9/1978 | Spolnicki ............... 57/140 BY |
| 4,138,194 A | * | 2/1979 | Beasley et al. .............. 385/143 |
| 4,161,500 A | | 7/1979 | Schleinitz et al. .......... 264/1.29 |
| 4,274,709 A | | 6/1981 | Asai ............................ 385/128 |
| 4,399,084 A | | 8/1983 | Sagawa et al. ................ 264/27 |
| 4,399,099 A | * | 8/1983 | Buckles ........................ 422/58 |
| 4,500,706 A | | 2/1985 | Mathis et al. ................ 528/481 |
| 4,552,431 A | | 11/1985 | Allemand et al. .......... 385/143 |
| 4,568,146 A | | 2/1986 | Ueba et al. .................. 380/145 |
| 4,660,928 A | * | 4/1987 | Jaeger et al. ................ 385/143 |
| 4,671,905 A | | 6/1987 | Vyas .......................... 264/1.29 |
| 4,798,445 A | | 1/1989 | Yamamoto et al. ......... 385/143 |
| 4,806,289 A | | 2/1989 | Laursen et al. ............. 264/1.29 |
| 4,812,011 A | * | 3/1989 | Tatsukami et al. .......... 385/143 |
| 4,822,122 A | | 4/1989 | Yamamoto et al. ........ 385/1.24 |
| 4,842,369 A | * | 6/1989 | Teshima et al. ............. 385/145 |
| 4,851,172 A | | 7/1989 | Rowan et al. ............... 264/130 |
| 4,902,461 A | | 2/1990 | Schippers .................. 264/10.3 |
| 4,927,231 A | | 5/1990 | Levatter ....................... 385/31 |
| 4,930,863 A | | 6/1990 | Croitoriu et al. ............ 385/125 |
| 4,963,298 A | | 10/1990 | Allen et al. .................... 264/12 |
| 4,966,435 A | | 10/1990 | Matsumoto et al. ........ 385/143 |
| 4,970,038 A | | 11/1990 | Stanko ....................... 264/130 |
| 4,980,012 A | | 12/1990 | Nieda et al. ................. 156/441 |
| 5,009,955 A | | 4/1991 | Abu-Isa ....................... 428/401 |
| 5,096,654 A | * | 3/1992 | Craggs et al. ............... 264/570 |
| 5,108,675 A | | 4/1992 | Matsuo et al. .............. 264/103 |
| 5,137,666 A | | 8/1992 | Knox et al. ................. 264/103 |
| 5,153,932 A | | 10/1992 | Blyler, Jr. et al. ............. 385/15 |
| 5,155,796 A | * | 10/1992 | Oonishi et al. ............. 385/143 |
| 5,173,310 A | | 12/1992 | Katou et al. ................ 425/72.2 |
| 5,221,308 A | | 6/1993 | Krohn et al. .................. 65/393 |
| 5,346,655 A | | 9/1994 | Blyler, Jr. et al. ......... 264/1.28 |
| 5,468,555 A | | 11/1995 | Lijten et al. ................. 428/365 |
| 5,471,553 A | | 11/1995 | Teshima ..................... 385/125 |
| 5,474,845 A | | 12/1995 | Turunen et al. ............. 428/364 |
| 5,518,670 A | | 5/1996 | Budenbender et al. ........ 264/28 |
| 5,595,699 A | | 1/1997 | Wright et al. ............... 264/169 |
| 5,618,479 A | | 4/1997 | Lijten et al. ................. 264/103 |
| 5,637,400 A | | 6/1997 | Brekner et al. .............. 428/373 |
| 5,661,880 A | | 9/1997 | Schippers et al. ............. 28/240 |
| 5,676,879 A | | 10/1997 | Heynderickx et al. ... 252/299.1 |
| 5,698,146 A | | 12/1997 | Schippers et al. .......... 264/103 |
| 5,700,490 A | | 12/1997 | Meise ........................ 425/72.2 |
| 5,731,010 A | | 3/1998 | Kikutani et al. .......... 425/131.5 |
| 5,783,127 A | | 7/1998 | Gross et al. ................. 264/103 |
| 5,843,574 A | * | 12/1998 | Suryadevara et al. ....... 428/364 |
| 5,916,999 A | | 6/1999 | Berbner et al. .............. 528/254 |
| 5,928,587 A | | 7/1999 | Schippers ................... 264/103 |
| 6,132,650 A | * | 10/2000 | Nakamura ................. 264/1.29 |
| 6,529,665 B1 | * | 3/2003 | Yamashita et al. .......... 385/124 |
| 6,534,579 B1 | | 3/2003 | Nishijima et al. ........... 524/340 |
| 2002/0146563 A1 | * | 10/2002 | Risch .......................... 428/375 |

FOREIGN PATENT DOCUMENTS

| | | |
|---|---|---|
| JP | 57056513 | 4/1982 |
| JP | 60252714 | 12/1985 |
| JP | 1194220 | 8/1986 |
| JP | 62250219 | 10/1987 |
| JP | 4185710 | 7/1992 |
| JP | 5195309 | 8/1993 |
| JP | 7157919 | 6/1995 |
| JP | 10253840 | * 9/1998 ............ G02B/6/00 |
| WO | PCT/EP94/00479 | 9/1994 |
| WO | WO 01/14922 | * 3/2001 |

OTHER PUBLICATIONS

Biswas, P.K., Mechanical and Optical Properties of Oriented Fibres of Semicrystalline Polymers, Colloid and Polymer Science vol. 262 No. 8, Aug. 1994, pp 623.

(List continued on next page.)

Primary Examiner—Robert Davis
Assistant Examiner—Joseph S Del Sole
(74) Attorney, Agent, or Firm—Morgan, Lewis & Bockius LLP

(57) ABSTRACT

The present invention is an optical fiber made of semi-crystalline polymer. By "semi-crystalline" it is meant that final fiber product produced by the teaching herein has from about 30% to about 99% crystallinity.

7 Claims, 5 Drawing Sheets

OTHER PUBLICATIONS

Bodaghi, Hassan et al., The Fibrillar Stricture of Melt Spun and Drawn PP Filaments, International Polymer Processing, vol. III, Issue 2, Jun. 1988 Hanser Publishers, pps 100–1.

Karpierz, Miroslaw A., Orientational Nonlinearity in Liquid Crystalline Optical Waveguidelines, Proceedings of SPIE—The International Society for Optical Engineering, v 3731 1999 pp 112–116.

Rudolph, P et al., Fiber Crystal Growth from the Melt, Crystal Research and Technology (1999) vol. 34, No. 1, pp3–40.

"Acrylic PMMA (Polymethyl–Methacrylate) Specifications," 2003, pp. 1–3, <http://www.boedeker.com/acryl_p.htm>, Boedeker Plastics, Inc., Shiner, Texas.

* cited by examiner

APPARATUS FOR MANUFACTURING OPTICAL FIBER MADE OF SEMI-CRYSTALLINE POLYMER This application is a continuation-in-part of U.S. patent application Ser. No. 09/728,447, filed Dec. 1, 2000 now abandonded and entitled Apparatus for Manufacturing Optical Fiber made of Semi-Crystalline Polymer, which is a continuation-in-part of U.S. patent application Ser. No. 09/663,308 filed Sep. 15, 2000 now abandoned and entitled Apparatus for Manufacturing Optical Fiber made of Semi-Crystalline Polymer.

BACKGROUND OF THE INVENTION

Semi-crystalline polymers have been used to form fibers for textile applications for many years. The physical properties of a fiber is dependent on polymer molecular orientation and structural morphology developed during fiber spinning. The mechanical properties for the fibers are directly related to molecular orientation. Resins with higher molecular weight produce higher strength fibers if processed under the same processing conditions. The higher the degree of orientation the higher the tensile strength for a given fiber. However, the degree of crystallinity and crystalline structure play a very important role in producing fibers with good dimensional stability. Selecting high molecular weight polyolefin polymers with narrow molecular weight distribution keep the impurities to a minimum. These polymers can easily be extruded and drawn into extremely transparent fibers with controlled morphology. The high molecular weight allows the formation of strong fibers and obtain a very high degree of both amorphous and crystalline orientation. The high degree of crystallinity obtained by using such polymer provides dimensional stability that cannot be obtained using amorphous polymers.

Since polyolefins melt at low temperatures, extruding and processing of these polymers requires minimum energy as compared to all other polymers. For example, glass melts at 1200 C. and other amorphous polymers melt at much higher temperatures as compared to polyolefins. Therefore, it is much cheaper to produce optical fibers from polyolefin semi-crystalline fibers than those from glass and other amorphous polymers. These fibers are much lighter due to their inherent low densities and have excellent flexibility for handling. Glass fibers are simply too heavy and too fragile for handling and they require sophisticated claddings and end-to-end attachment devices.

In the manufacture of synthetic fibers including polypropylene, nylon and polyester, molten polymer is extruded through small holes to form filaments which are drawn down and solidified on rotating rolls. In a second stage the solidified filaments are passed from a slow roll to a fast roll drawing them down several times in diameter. The filaments formation process is known as melt spinning, the solid state stretching process as drawing.

It has been well established in the melt spinning process that polymer melts are converted to uniaxially oriented filaments. The orientation in melt spun filaments has been investigated by various researchers using wide angle x-ray scattering (WAXS), birefringence and small angle x-ray scattering (SAXS). Generally molecular orientation has been expressed in terms of Hermans-Stein orientation factors, with WAXS being applied to crystalline orientation and birefringence to detect amorphous orientation [Kitao, T., Yamada K., Yamazaki, T., Ohya S.: Sen-i-Gakkashi, 28, p. 61 (1972); Kitao, T. Ohya. S., Furukawa. J. Yamashita. S.: J. Polym. Sci. Polym. Phys. 11, p. 1091 (1973); Abbott, L. E. White, J. L.: Appl. Polym. Symp. 20, p. 247 (1973); Dees, J. R., Spritiell, J. E.: J. Appl. Polym. Sci. 18, p. 1055 (1974); Spruiell, J. E., White, J. L.: Polym. Enj. Sci. 15, p. 660 (1975); Nadella, H. P., Henson, H. M. Spruiell J. E., White, J. L.: J. Appl. Polym. Sci. 21, p. 3003 (1977); Bankar, V. G., Spruiell. J. E., White. J. L. J. Appl. Polym. Sci. 21, p. 2341 (1977); Shimizu. J., Toriumi, K., Imai, Y.: Sen-i-Gakkashi 33, p. T-255 (1977); Danford M. D., Spruiell. J. E. White, J. L.: J. Appl. Polym. Sci. 22, p. 3351 (1978); Heuvel, H. M., Huisman, R.: J. Appl. Polym. Sci. 22, p. 2229 (1978)]. This orientation is found to be a unique function of the spinline stress. For the case of polyolefins WAXS has generally detected a lamellar structure which at high spinline stresses is oriented perpendicular to the fiber axis [Dees, J. R., Spruiell J. E.: J. Appl. Polym. Sci. 18, p. 1055 (1974); Spruiell J. E., White. J. L.: Polym. Enj. Sci. 15, p. 660 (1975); Nadella, H. P., Henson, H.M., Spruiell J. E., White, J. L.: J. Appl. Polym. Sci. 21, p. 3003 (1977); Katayama, K., Amano, T., Nukamura, K.: Koll Z—Z Polym. 226, p. 125 (1967), Noether, H. D., Whitney, W. Koll Z—Z Polym. 251, p. 991 (1973); Sprague, B. S., Macromol, J.: Sci. Phys. B8, p. 157 (1973)]. From the work of Keller and Machin [Keller, A., Machin. M. J. J.: Macromol. Sci. Phys. 131, p. 41 (1967)], Dees and Spruiell [Dees, J. R., Spruiell J. E.: J. Appl. Polym. Sci. 18, p. 1055 (1974)] and later investigators it is generally hypothesized that the structure observed by SAXS and WAXS consists of folded chain lamellae. These lamellae are arranged in aggregates to form a spherulitic superstructure when melt spinning is carried out at low spinline stresses but at higher spinning stresses they nucleate along lines parallel to the filament axes and grow radially outward to form a so called "row structure" or cylindrite morphology.

In the drawing process, filaments first exhibit local necking but they eventually become uniform at a point known as the natural draw ratio. The necked regions and drawn out filaments exhibit significantly increased levels of polymer chain orientation [Fankuchen, I., Macrk, H.: J. Appl. Phys. 15, p. 364 (1944); Wyckoff H. W.: J. Polym. Sci. 62, p. 83 (1962); Kasai, N., Kakudo, M.: J. Polym. Sci., pt. A2, p. 1955 (1961); Samules, R. J.: J. Polym. Sci. A-26, p. 2021 (1968); White, J. L., Dharod, K. C., Clark. E. S.: J. Appl. Polym. Sci. 18, p. 2539 (1974); Sze, G. M., Spruiell, J. E., White, J. L.: J. Appl. Polym. Sci. 20, p. 1823 (1976); Nadella, H. P., Spruiell, J. E., White, J. L.: J. Appl. Polym. Sci. 22, p. 3121 (1978); Kitao, T., Spruiell, J. E., White, J. L.: Polym. Eng. Sci. 19, p. 761 (1979)]. Another phenomenon occurring during the drawing process is the development of fibrillation which transforms the initially solid homogenous filament into a non-homogenous structure containing many "fibrils" together with elongated voids [Samuels, R. J.: J. Polym. Sci. A-26, p. 2021 (1968); White, J. L., Dharod, K. C., Clark, E. S.: J. Appl. Polym. Sci. 18, p. 2539 (1974); Sze. G. M., Spruiell. J. E., White, J. L.: J. Appl. Polym. Sci. 20, p. 1823 (1976), Nadella, H. P., Spruiell, J. E., White, J. L.: J. Appl. Polym. Sci. 22, p. 3121 (1978); Kitao, T., Spruiell, J. E., White, J. L.: Polym. Eng. Sci. 19, p. 761 (1979); Statton, W. O.: J. Polym. Sci. 41, p. 143: Sakaoku. K., Peterline, A.: J. Polym. Sci. A-29, p. 895 (1974); Glenz, W., Morossoff, N., Peterlin, A.: Polymer Letters 9, p. 211 (1971); Muzzy, J. E., Hansen, D.: Textile Res. J. 41, p. 436 (1971); Vonk, C. G.: Colloid Polym. Sci. 257, p. 1021 (1979)]. It is this problem and its interaction with melt spinning that is a concern. In general, observations of fibrillation have been qualitative in character, with authors noting the existence of this phenomenon, and sometimes hypothesizing mechanisms [Sakaoku, K., Peterline, A. J. Polym. Sci. A-29, p. 895 (1971); Peterlin, A.: J. Polym. Sci. 9, p. 61 (1965)]. Investigations [Sze, G. M., Spruiell J. E., White, J. L.: J. Appl. Polym. Sci. 20, p. 1823 (1976); Kitao, T., Spruiell, J. E., White, J. L.: Polym. Eng.Sci. 19, p. 761 (1979)] using SAXS and scanning electron microscopy (SEM) have indicated that in high density polyethylene and polypropylene fibrillation tends to increase with draw ratio and decrease with increasing draw temperature.

SUMMARY OF THE INVENTION

The present invention is an optical fiber made of semi-crystalline polymer. By "semi-crystalline" it is meant that the final fiber product produced by the teaching herein has from about 30% to about 99% crystallinity.

The apparatus for manufacturing optical fiber made of semi-crystalline polymers includes: An extruder heats polymer resin to produce molten polymer and supplies the molten polymer at a constant pressure. A gear pump is in fluid communication with the extruder, receives the molten polymer and controls the polymer flow rate. A spinneret is in fluid communication with the gear pump and spins the molten polymer into the optical fibers. A heater controls the temperature of the optical fibers after the fibers exit the spinneret. The optical fibers are slowly cooled from molten to ambient temperature to eliminate radial morphological variations. A take-up roller tensions the optical fibers after the fibers exit the spinneret to maximize crystallization of the molten polymer.

DETAILED DESCRIPTION

Apparatus and Materials

Figure 1:
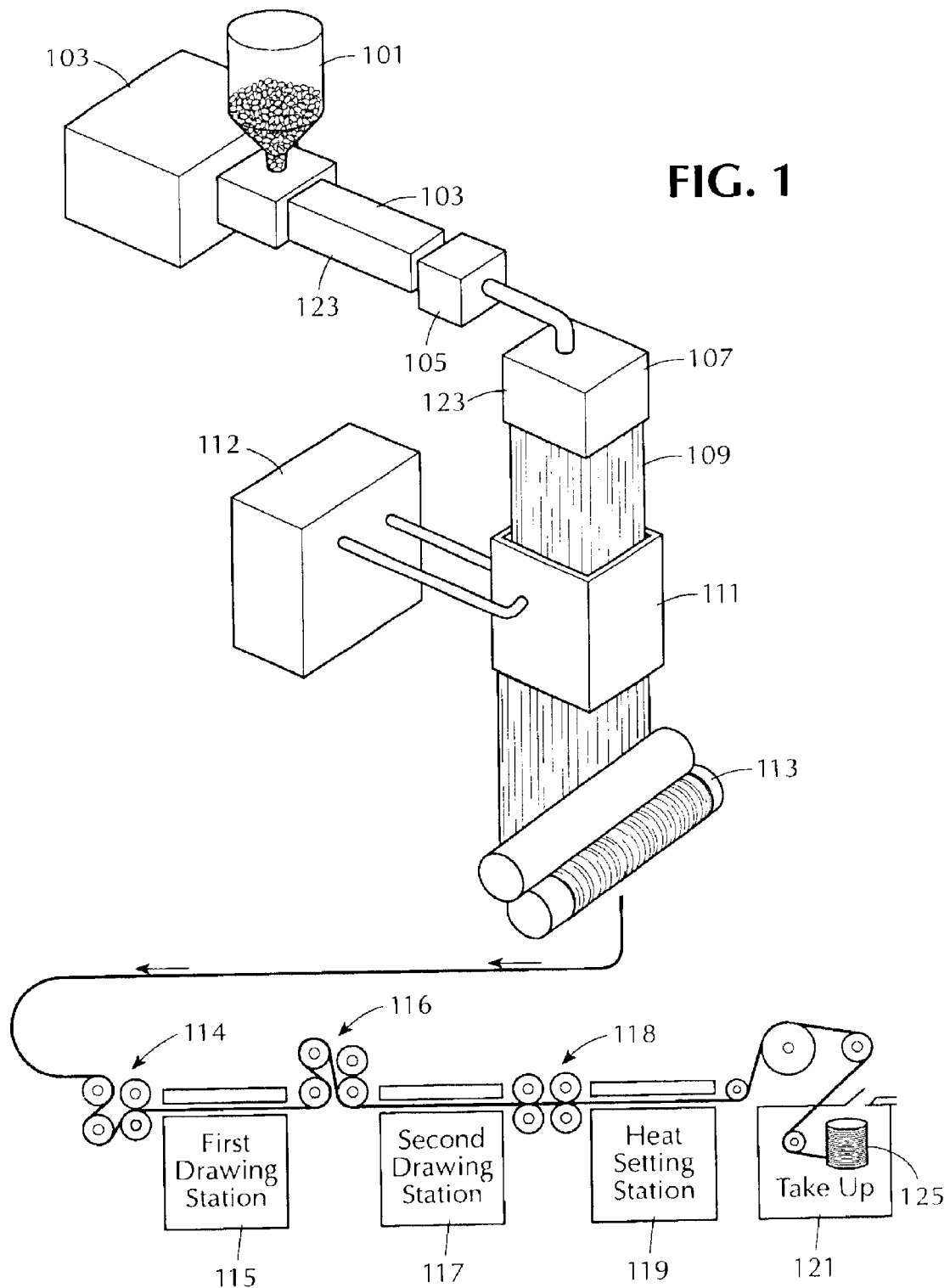
FIG. 1 is a schematic view of a first embodiment of the apparatus of the present invention.

The present invention employs semi-crystalline homopolymer resins instead of inorganic glass, amorphous, or other copolymers as raw materials. This will give the following advantages compared to glass and other presently used resins.

First, less impurity is present due to selecting high molecular weight polymers with very narrow molecular weight distribution and minimized processing additives. Polyethylene resin contains only a very minute amount of antioxidant, which is less than 600 PPM. Antioxidants are used to prevent thermal degradation during processing, as even trace amounts of metals and other impurities on the resins should be avoided. Outgassing for this resin is under 14 PPM and polydispersity of less than 4. Such narrow molecular weight distribution is the most crucial factor in order to eliminate radial morphological variations due to the influence of shear at the die wall before extrudate exits the die as well as formation of the fiber final structure. High-density, high molecular weight polyolefin, resins with molecular weight ranging from 50,000–300,000 and polydispersity of <3 are the most desired materials. Other semi-crystalline homopolymers such as polypropylene, isotactic polystyrene, polyethylene oxide, polyoxymethylene, nylons (such as, for example, nylon 6 or nylon 66), polyvinylidene fluoride and alike can also be used to form advance fibers for such optical applications. Since the degree of crystallinity for these resins are not as high as those of polyethylene resins, we will incorporate up to 5% clearing agents during polymerization in order to form small crystals of controlled structure and eliminate undesired density variations within the formed fibers. By "semi-crystalline" it is meant that the final fiber product produced by the teaching herein has from about 30% to about 99% crystallinity.

Second, semi-crystalline resins are very easy to process and can be formed into pure fibers at much lower processing temperatures (lower energy costs during production) as compared to glass and amorphous polymers. They have lower density therefore are much lighter than glass and easier to handle.

Fiber spinning is preformed by two different methods. These are traditional spinning and high speed spinning. Traditional spinning is done in two separate steps. First, fibers are immediately cooled or quenched into a water bath and then are collected as spun fibers. These fibers then are drawn in a second step of the process. In high speed spinning process, fibers are made in a single step from the initial resin into final drawn fibers.

It is well known in the art that the conventional two step spinning and drawing method always produce fibers with a higher degree of both amorphous and crystalline orientation. In contrast, less quality fibers are produced with high speed spinning, since the solid state mechanical drawing step is missing. However, the production rate is much higher for the high-speed spinning as compared to conventional fiber spinning. Although highly oriented and very strong fibers are produced by such methods, structural variations within the fibers have not been eliminated. In contrast, the subject invention produces engineered fibers with controlled structural morphology having a maximum degree of both crystalline and amorphous orientations.

The present invention precisely controls morphological variations developed during the spinning of fibers and incorporates the stepwise drawing procedure into the fiber spinning line to produce the optical fibers in one effective procedure and in a continuous manner. This invention eliminates incomplete crystallization which can occur during spinning under low tension, transforms the spherulitic morphology into extended chain lamellae crystals, and removes all microvoids and other morphological defects within the fibers. The above is accomplished in the present invention by precisely controlling both temperature and tension during the fiber formation process. Temperature is controlled by providing heating zones around key components during fiber manufacture, such as the extruder and the spinneret. Additionally, an air heater provides warm air to the point of egress of the molten filaments from the spinneret, this area preferably surrounded by a porous skirt in order to allow slow, controlled cooling of the fibers from molten to ambient.

Tension is controlled by a plurality of take up rollers and tension rolls that pass the cooling fibers in an unwound state between the requisite processing stations.

A first embodiment of the apparatus of the present invention is shown in FIG. 1. Special polymer resins mentioned above are added into the hopper 101 of an extruder 103. The extruder supplies the molten polymer to a gear pump 105 at a constant pressure at, for example, between about 50 bar and about 250 bar, and preferably about 200 bar. A precision gear pump 105 is used to provide a constant polymer flow rate to the spinneret 107.

The spin pump 105 is a positive displacement, four stream gear pump with hydraulic splits, and provides a constant flow rate of polymer through the spinneret 107 of, for example, between about 0.01 cubic centimeter/revolution and about 3 ccm/rev., and preferably about 1.2 ccm/rev. This pump 105 is very crucial so that any flow rate variations be eliminated in order to have linear density along the filaments, and subsequently along the tow.

As filaments 109 emerge from the spinneret 107, they are accelerated (at, for example, between about 200 meter/min., and about 600 m/min., and preferably about 500 m/min.) away from the outlet, allowing stretching to occur while the polymer is still molten. A transverse air stream heated by air heater 112 and communicating with skirt 111, preferably a chamber having an ingress and egress through which filaments 109 pass, then slowly cools the stretched, semi-molten filaments. More specifically, air heater 112 passes warm air, by means of a blower, to skirt 111. The air from air heater 111 is of a temperature between the temperature of the molten filaments and the ambient air temperature, for example, between about 20° C. and about 120° C., and preferably about 100° C. The air is blown from air heater 112 at a speed of, for example, between about 5 cubic feet/min. and about 100 cft./min., and preferably about 50 cft./min. While only one air heater 112 and skirt 111 are shown, the subject invention contemplates one or more air heaters 112 and skirts 111 forming one or more temperature zones, with each temperature zone having a temperature gradient lower than the preceding temperature zone, through which the filaments 109 pass to control their cooling. The speed and temperature of the air stream from air heater 112 is controlled to help ensure uniformity along the filaments. One to ten meters below the spinneret, these filaments 109 are brought together and passed, un-wound onto take up godets 113. Uniform speed of godets 113 is critical to the filament speed and structural uniformity. The speed of the godets 113 determines the tension in the thread line, the speed of godets 113 being, for example, between about 220 meter/min. and about 660 m/min., and preferably about 550 m/min., to achieve tension of, for example, about 10 percent. Drawing of fibers is a stretching process, which increases the strength of the filaments by increasing the orientation of the polymer molecules to the parallel axis of the filaments. Drawing in the solid state is much more effective at producing orientation of the molecules than the stretching which occurred in the molten state during extrusion like high speed spinning.

At this stage, the tow of filaments 109 is transferred via two feed rolls into the first zone hot drawing oven 115. In this first drawing step the filaments are stretched at a temperature above the glass transition temperature, and below the melting temperature. In the first drawing step, the draw ratio is, for example, between about 1 and about 3, and is preferably about 2, while the temperature is, for example, between about 25° C. and about 110° C., and is preferably about 100° C. Drawn filaments are stretched further through the second drawing zone 117 at elevated temperatures and eventually annealed at station 119 under tension to perfect and freeze the final fiber structure. In the second drawing step, the draw ratio is, for example, between about 2 and about 20, and is preferably about 12, while the temperature is, for example, between about 90° C. and about 155° C., and is preferably about 150° C. The fibers are annealed under tension at between about 90° C. and 155° C., and preferably about 150° C. The fibers then are wound automatically and packaged for shipment at station 121.

There are several heating zones 123, preferably being electrically controlled heating units and associated blowers or fans within an enclosure, which maintain the desired temperatures around the extruder 103 and the spinning head 107. Unlike conventional spinning, as the molten filaments are exiting the die, warm air is applied simultaneously around the fibers by heater 112 to cool them uniformly in order to eliminate radial morphological variations. As stated above these fibers are then carefully solidified by godet or take up roll 113 under high spinning stress in order to maximize crystallization, and are drawn down on a feed role rotating at the desired take-up speed. At this point the filaments are transferred under higher tension from tension roll 114 through the first hot air drawing station 115, where a natural draw ratio of up to seven times is applied. This will remove all the necks and transforms the spherulitic crystals into lamellae morphology. These fibers then, under high tension from tension roll 116, enter the second drawing station 117 where they are continuously drawn at maximum draw ratios and at much higher drawing temperatures. At this stage, resultant fibers exhibit a very high c-axis orientation of the polymer crystals (extended chain morphology at the core region of the fibers, which is perfectly crystalline) and are surrounded by a sheath with a two phase morphology of altering crystalline and amorphous regions having a high degree of both amorphous and crystalline orientation. These fully oriented fibers then pass through the final heat setting station 119 under tension from tension roll 118 to secure their crystallization as well as to remove all other impurities. One example of these impurities is extremely small voids, ranging in size from one to several hundred angstrom, that may still exist within the structure of these fully oriented fibers. Incomplete crystallization is prevented, as is impurity formation, during spinning and drawing by the present invention. Finally, the fibers are wound at take-up station 121, which includes a windup bobbin 125.

Fibers drawn by this invention at drawing temperatures close to their melting points will be extremely transparent at the core and have highly extended crystalline structures. Such fibers exhibit a high degree of c-axis crystalline orientation, which contribute extensively to a higher transmission rate as well as reduction in the attenuation loss. In addition, such highly crystalline fibers will have a very high tenacity ranging from 5–14 g/denier. Tenacity for glass fiber is from 5–8 g/denier. Percent elongation to break for semi-crystalline fibers of this invention ranges from 5%–50%. Glass fibers have percent elongation to break from 1%–25%. High degree of crystallinity for fibers of this invention prevents any molecular shrinkage within these fibers. As a result, excellent dimensional stability is expected from such fibers when used under different environmental conditions. Since these semi-crystalline fibers have excellent ductility they are easier to handle and can be bent without fractures. They can be produced almost endless due to their unique radius of curvature and need less number of terminals in long distance applications. They can also be easily connected to light source or other fibers.

Figure 2:
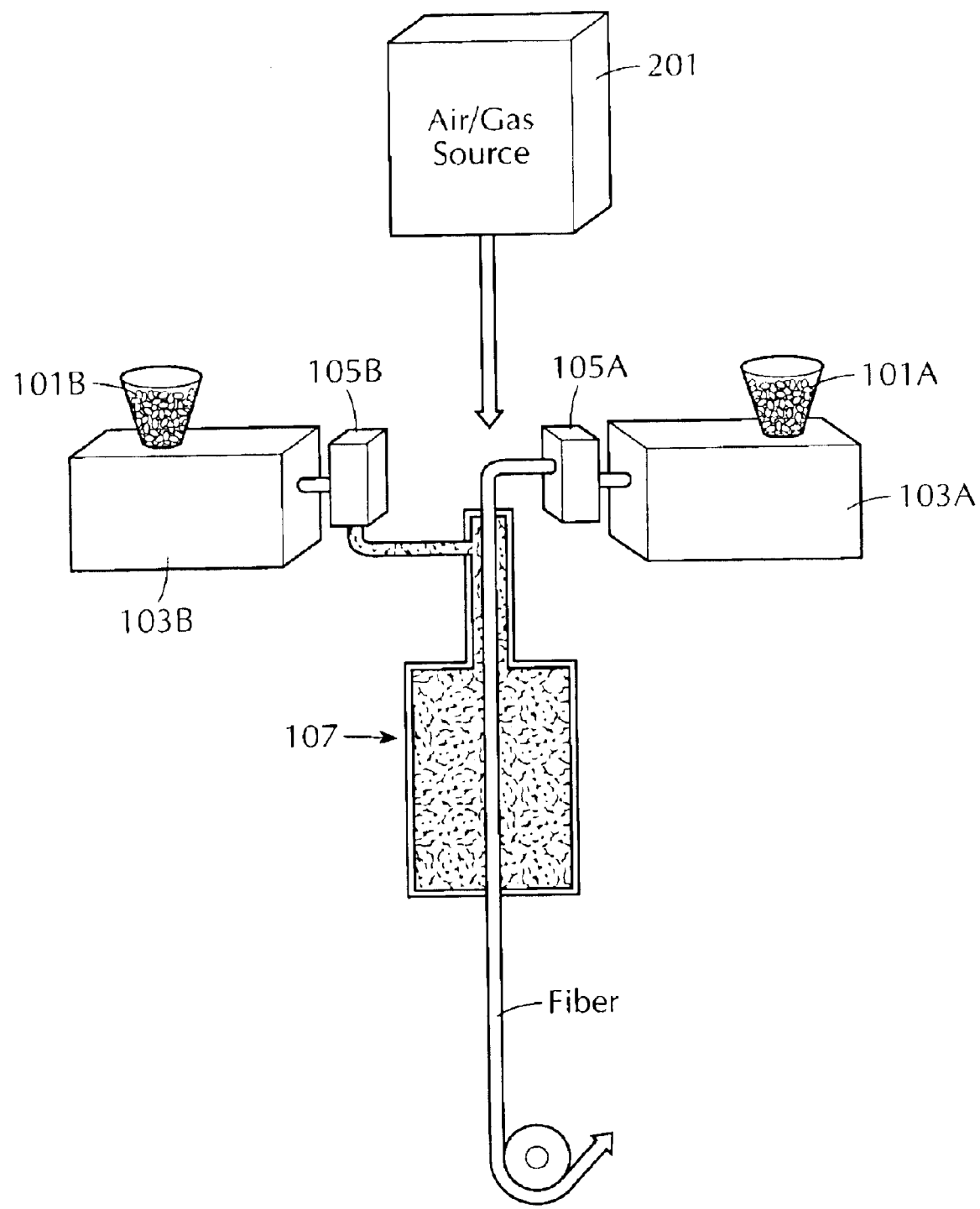
FIG. 2 is a schematic view of a second embodiment of the apparatus of the present invention.

The second embodiment of the present invention is shown in FIG. 2. The second embodiment of FIG. 2 shares many of the same components of the first embodiment of FIG. 1, and like components in these two embodiments are described above regarding FIG. 1 and share like element numbers. Similarly, all of the pressure, speed, temperature and draw ratio parameters of FIG. 1 (i.e., the first embodiment) apply to FIG. 2 (i.e., tile second embodiment). Unlike the embodiment of FIG. 1, the embodiment of FIG. 2 facilitates the manufacture of fibers having an outer sheath of a first polymer, and an inner core section of a second polymer. Alternatively, the inner core section can be hollow, instead of being comprised of a second polymer. When the inner core section is hollow, it may contain air (which transmits light better than a solid polymer in the inner core section), a vacuum, or a gas (for example, nitrogen or helium) that facilitates light transmission better than air. Note that when the fiber is hollow, fiber costs are lower than in a solid fiber. Additionally, when the fiber of the present invention has an outer sheath of a first polymer, cladding is not required.

Figure 3A:
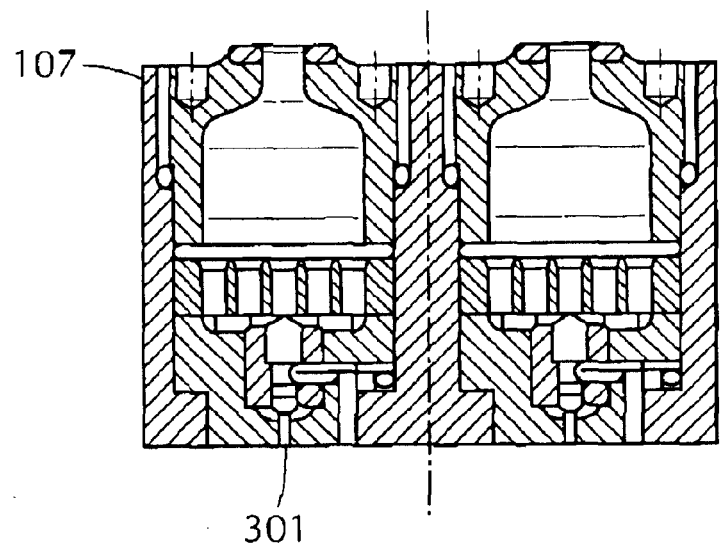
FIG. 3A is a cross-sectional view of a spinneret of the present invention.
Figure 3B:
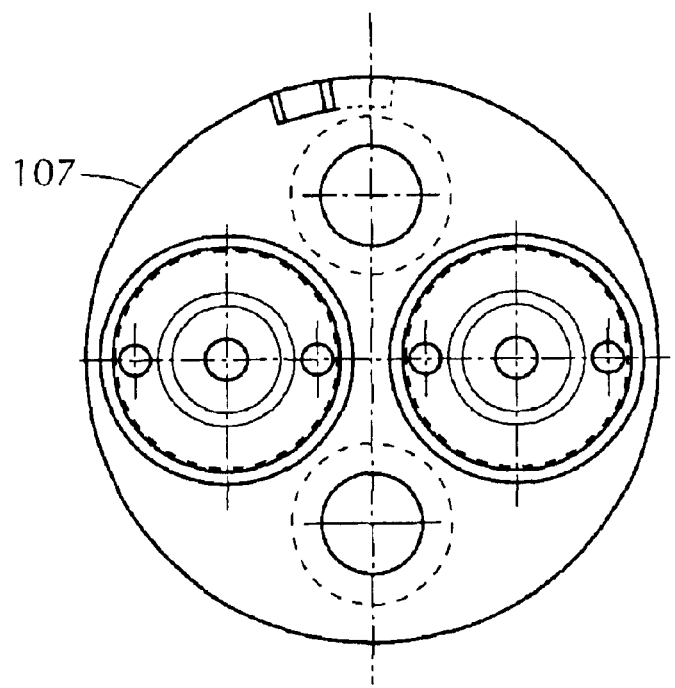
FIG. 3B is an end view of a spinneret of the present invention.

In order to produce a fiber having an outer sheath of a first polymer and an inner core section of a second polymer, two hoppers 101A and 101B each feed extruders 103A and 103B, respectively. Gear pumps 105A and 105B communicate with extruders 103A and 103B, respectively. Gear pumps 105A and 105B arc in fluid communication with spinneret 107. Spinneret 107 has a unique configuration (shown in FIGS. 3A and 3B) that allows the polymer (or gas)

from hopper 101A, extruder 103A and gear pump 105A to be enrobed by the polymer from hopper 101B, extruder 103A and gear pump 105A. More specifically, spinneret 107 has a single orifice 301, as shown in FIGS. 3A and 3B, through which a first polymer and a second polymer are sequentially passed to form a fiber having an outer sheath of a first polymer and an inner core of a second polymer. Spinneret 107 may be a spinneret manufactured by Fourne Polymertechnik of Germany and can have one, or more than one, orifices. The formed filament then undergoes processing as described in the first embodiment of FIG. 1 starting at take-up roll 113 of FIG. 1 and continuing through all stations to take-up station 121 of FIG. 1. When air or a gas, instead of a polymer, fills the inner core section of the fiber, hopper 101A, extruder 103A and gear pump 105A are replaced by air/gas source 201. Air gas source 201 is thus in fluid communication with spinneret 107.

Next referring to a third embodiment of the present invention, this embodiment encompasses the temperature control protocol of the first embodiment of the present invention, with the tension control protocol being optionally employed in a continuous manner, or in a non-continuous fashion at a later time and/or local, or not being employed at all. For this third embodiment of the apparatus of the present invention, reference is again made to FIG. 1, and the pressure, speed, temperature and draw ratio parameters of FIG. 1 (i.e., the first embodiment) apply to the third embodiment. Special polymer resins mentioned above are added into the hopper 101 of an extruder 103. The extruder supplies the molten polymer to a gear pump 105 at a constant pressure. A precision gear pump 105 is used to provide a constant polymer flow rate lo the spinneret 107.

The spin pump 105 is a positive displacement, gear pump, and provides a constant flow rate of polymer through the spinneret 107. This pump 105 is very crucial so that any flow rate variations be eliminated in order to have linear density along the filaments, and subsequently along the tow.

As filaments 109 emerge from the spinneret 107, they are accelerated away from the outlet, allowing stretching to occur while the polymer is still molten. A transverse air stream heated by air heater 112 and communicating with skirt 111, preferably a chamber having an ingress and egress through which filaments 109 pass, then slowly cools the stretched, semi-molten filaments. More specifically, air heater 112 passes warm air, by means of a blower, to skirt 111. The air from air heater 111 is of a temperature between the temperature of the molten filaments and the ambient air temperature. While only one air heater 112 and skirt 111 are shown, the subject invention contemplates one or more air heaters 112 and skirts 111 forming one or more temperature zones, with each temperature zone having a temperature gradient lower than the preceding temperature zone, through which the filaments 109 pass to control their cooling. This cooling can also be performed in one or more hot water baths, as opposed to air chambers. The speed and temperature of the air stream from air heater 112 is controlled to help ensure uniformity along the filaments.

There are several heating zones 123, preferably being electrically controlled heating units and associated blowers or fans within an enclosure, which maintain tile desired temperatures around the extruder 103 and the spinning head 107. Unlike conventional spinning, as the molten filaments are exiting the die, warm air and/or warm water is applied simultaneously around the fibers by heater 112 to cool them uniformly in order to eliminate radial morphological variations. As stated above, in this third embodiment of the present invention, the fibers may or may not next proceed to controlled tension processing stations as described in the first embodiment, either immediately or after passage of time.

A fourth embodiment of the present invention encompassing the tension control protocol is next described, either with or without the temperature control process of the first embodiment of the present invention; and if with, either immediately thereafter or after passage of time (i.e. continuous or non-continuous). Again, the pressure, speed, temperature and draw ratio parameters of FIG. 1 (i.e., the first embodiment) apply to this fourth embodiment. Referring to FIG. 1, filaments previously processed either with or without the controlled temperature protocol of the first embodiment of the present invention are brought together and passed onto take up godets 113. Uniform speed of godets 113 is critical to the filament speed and structural uniformity. The speed of the godets 113 determines the tension in the thread line. Drawing of fibers is a stretching process, which increases the strength of the filaments by increasing the orientation of the polymer molecules to the parallel axis of the filaments. Drawing in the solid state is much more effective at producing orientation of the molecules than the stretching which occurred in the molten state during extrusion like high speed spinning.

At this stage, the tow of filaments 109 is transferred via two feed rolls into the first zone hot drawing oven 115. In this first drawing step the filaments are stretched at a temperature above the glass transition temperature, and below the melting temperature. Drawn filaments are stretched further through the second drawing zone 117 at elevated temperatures and eventually annealed at station 119 under tension to perfect and freeze the final fiber structure. The fibers then are wound automatically and packaged for shipment at station 121.

As stated above, these fibers are then carefully solidified by godet or take up roll 113 under high spinning stress in order to maximize crystallization, and are drawn down on a feed role rotating at the desired take-up speed. At this point the filaments are transferred under higher tension from tension roll 114 through the first hot air drawing station 115, where a natural draw ratio of up to seven times is applied. This will remove all the necks and transforms the spherulitic crystals into lamellae morphology. These fibers then, under high tension from tension roll 116, enter the second drawing station 117 where they are continuously drawn at maximum draw ratios and at much higher drawing temperatures. At this stage, resultant fibers exhibit a very high c-axis orientation of the polymer crystals (extended chain morphology at the core region of the fibers, which is perfectly crystalline) and are surrounded by a sheath with a two phase morphology of altering crystalline and amorphous regions having a high degree of both amorphous and crystalline orientation. These fully oriented fibers then pass through the final heat setting station 119 under tension from tension roll 118 to secure their crystallization as well as to remove all other impurities. One example of these impurities is extremely small voids, ranging in size from one to several hundred Angstrom, that may still exist within the structure of these fully oriented fibers. Incomplete crystallization is prevented, as is impurity formation, during spinning and drawing by the present invention. Finally, the fibers are wound at take-up station 121, which includes a windup bobbin 125. As stated above, in this fourth embodiment of the present invention, the fibers may or may not have been, either immediately or after passage of time, first processed with the temperature control protocol of the first embodiment of the present invention.

Non-limiting examples of extrusion conditions are shown below in Table 1.

TABLE 1

| Spin date June 2000 | | | Material Polypropylene Pump Speeds (rpm) | | | Pressure (bar) | | | Spin finish Temperatures (° C.) Extruder | | | |
|---|---|---|---|---|---|---|---|---|---|---|---|---|
| Spin-date | Sample | Doff | Extr | Spin 1 | Spin 1 | $p_1$ | $p_2$ | $p_4$ | ZI | ZII | ZIII | MII |
| 06/27 | 1 | 1 | 57.5 | 12.8 | 12.5 | 75 | 200 | 48.5 | 225 | 250 | 260 | 262 |
|  | 1 | 2 | 57.5 | 12.8 | 12.5 | 75 | 200 | 48.5 | 225 | 250 | 260 | 262 |
|  | 1 | 3 | 57.5 | 12.8 | 12.5 | 75 | 200 | 48.5 | 225 | 250 | 260 | 262 |
|  | 1 | 4 | 57.5 | 12.8 | 12.5 | 75 | 200 | 48.5 | 225 | 250 | 260 | 262 |
| 06/28 | 1 | 5 | 57.5 | 12.8 | 12.5 | 75 | 200 | 48.5 | 225 | 250 | 260 | 262 |
|  | 1 | 6 | 57.5 | 12.8 | 12.5 | 75 | 200 | 48.5 | 225 | 250 | 260 | 262 |
|  | 1 | 7 |  | with hot godets no goog running | | | | | 225 | 250 | 252 | 252 |
|  | 6 | 1 |  | | | | | | 225 | 245 | 245 | 245 |
|  |  | 2 |  | | | | | | 225 | 245 | 245 | 245 |
| 06/29 |  | 1 | 53.0 | 25.0 | 0.0 | 75 | 190 | 37.5 | 225 | 245 | 252 | 252 |
|  |  | 2 | 53.0 | 25.0 | 0.0 | 75 | 190 | 37.3 | 225 | 245 | 252 | 252 |
|  |  | 3 | 25.5 | 15.0 | 0.0 | 75 | 190 | 27.0 | 225 | 245 | 252 | 252 |
|  |  | 4 | 52.2 | 12.8 | 12.6 | 75 | 190 | 22.6 | 225 | 245 | 252 | 252 |
|  |  | 5 | 52.2 |  |  | 75 | 190 |  | 225 | 245 | 252 | 252 |
|  |  | 6 | 52.2 |  |  | 75 | 190 |  | 225 | 245 | 252 | 252 |
|  |  | 7 | 52.2 |  |  | 75 | 190 |  | 225 | 245 | 252 | 252 |

| Spin date June 2000 | | | Spinneret Ø 0.3/0.5/0.65/0.8 100 u Temperatures (° C.) | | Godets (m/min) | | Winder (DH/ m/min) | (°) | Static mixer Without Quench | | Temp. dryer Run Time | |
|---|---|---|---|---|---|---|---|---|---|---|---|---|
| Spin-date | Sample | Doff | $MII_m$ | Melt pipe | Spin head | 1 | 2 | Wind | Wobb | Helix Ang. | (Pa) p. | (° C.) Temp | Start-Finish | Re. () |
| 06/27 | 1 | 1 | 259.7 | 260 | 260.0 | 260 | 260 | 250 | 400 | 0 | | | (1,4) |
|  | 1 | 2 | 259.7 | 260 | 260.0 | 250 | 250 | 250 | 400 | z. T | | | (1) |
|  | 1 | 3 | 259.7 | 260 | 260.0 | 250 | 250 | 250 | 400 | | 75 | 21 | (1) |
|  | 1 | 4 | 259.7 | 260 | 260.0 | 250 | 250 | 250 | 400 | | 75 | 21 | (2) |
| 06/28 | 1 | 5 | 259.7 | 260 | 260.0 | 250 | 250 | 250 | 400 | | 75 | 21 | (3) |
|  | 1 | 6 | 259.7 | 260 | 260.0 | 250 | 250 | 250 | 400 | | 75 | 21 | (2) |
|  | 1 | 7 |  |  |  |  |  |  |  | | 75 | 21 | (2) |
|  | 6 | 1 | 251.4 | 252 | 252.0 | 250 | 250 | 250 | 400 | | 75 | 21 | (2) |
|  |  | 2 | 244.8 | 245 | 243.0 | 250 | 250 | 250 | 400 | | 75 | 21 | (2) |
| 06/29 |  | 1 | 251.5 | 252 | 248.0 | 250 | 250 | 250 | 400 | | 150 | 21 | (2) |
|  |  | 2 | 251.5 | 252 | 248.0 | 450 | 450 | 540 | 500 | | 150 | 21 | (2) |
|  |  | 3 | 251.5 | 252 | 248.0 | 250 | 250 | 250 | 350 | | 150 | 21 | (2) |
|  |  | 4 | 251.5 | 245 | 245.0 | 250 | 250 | 250 | 350 | | 150 | 21 | (2) |
|  |  | 5 | 251.5 | 245 | 245.0 | 250 | 250 | 250 | 350 | | 150 | 21 | (2) |
|  |  | 6 | 251.5 | 245 | 245.0 | 250 | 250 | 250 | 350 | | 150 | 21 | (2) |
|  |  | 7 | 251.5 | 245 | 245.0 | 250 | 250 | 250 | 350 | | 150 | 21 | (2) |

(1) Spinneret 0._mm/80 u
(2) Spinneret 0._mm/100 u
(3) Spinneret 0.8 mm/100 u
Spinneret 0.3 mm was no running
(4) without quench air Non-limiting examples of polymer resins that can be employed with the embodiment of FIG. 2 are shown in Table 2, below.

TABLE 2

| Union Carbide Polypropylene Grade Number | Melt Flow | MWD | Starting Temp., Melt C. | Sample wt. |
|---|---|---|---|---|
| 1. WRD5-1561/LR-10207-80-A | 1.5 | Broad | 260 | 50 lbs. |
| 1. WDR5-1562/LR-10207-80-B | 6 | Medium | 250 | 50 lbs. |

TABLE 2-continued

| Union Carbide Polypropylene Grade Number | Melt Flow | MWD | Starting Temp., Melt C. | Sample wt. |
|---|---|---|---|---|
| 1. WDR5-1563/LR-10207-80-C | 10 | Narrow | 245 | 50 lbs. |
| 1. WRD5-1554/LR-10207-80-D | 3.5 | Broad | 250 | 50 lbs. |
| 1. WRD5-1565/LR-10207-80-E | 10 | Broad | 245 | 50 lbs. |
| 1. WRD5-1566/LR-10207-80-F | 10 | Broad | 245 | 50 lbs. |

Still referring to Table 2, the resin employed therein for manufacture of the semi-crystalline fiber of the subject invention may have the following composition:

3–7 ppm (parts-per-million) magnesium, preferably under 5 ppm.

1–5 weight percent $TiO_2$ or polytetraflouroethylene, preferably 1 weight percent.

30–50 ppm aluminum, preferably under 42 ppm.

20–50 ppm chlorine, preferably under 24 ppm.

Under 600 ppm calcium stearate.

0.02 to 1.00 weight percent Irganox 1010 (antioxidant manufactured by Rhom Haas), preferably under 0.03 weight percent.

400 to 500 ppm Irgafos 168 manufactured by I.C.I., preferably 400 ppm

MFI (melt flow index) of 0.1 to 1,000, preferably under 10.

1 to 10 weight percent Xylene, preferably under 2 weight percent.

1 to 10 weight percent Decalin Soluble, preferably under 2 percent weight.

0.1 to 10.0 weight percent CH B (discoloration preventative manufactured by Ciba Geigi Industrial Chemical Corp.), preferably under 0.3 percent weight 1 to 5 weight percent DSI (an anti-static agent manufactured by Freeman Chemical Corp.), preferably 2.5 weight percent Outgassing to 1–50 ppm, preferably under 15 ppm Drawing conditions for selected resins of Table 2 employing the protocol of FIG. 2 are shown in Table 3, below.

TABLE 3

| Rollstands | Ovens (° F.) | Rollstands Factor | Rollstands Speed (fpm) | Takeup |
|---|---|---|---|---|
| Sample 1 | | | | |
| 1 | 300 | 1 | 5 | Use Leesona 959 |
| 2 | 299 | 6 | 34 | Tension 15 |
| 3 | 296 | 6.1 | 34 | Gage 2 |
| 4 | | 6.2 | 35 | |
| Sample 3 | | | | |
| 1 | 293 | 1 | 5 | Use Leesona 959 |
| 2 | 293 | 8 | 46 | Tension 15 |
| 3 | 301 | 9 | 52 | Gage 2 |
| 4 | | 10 | 58 | |
| Sample 6 | | | | |
| 1 | 293 | 1 | 5 | Use Lessona 959 |
| 2 | 292 | 9 | 51 | Tension 15 |
| 3 | 288 | 11 | 63 | Gage 2 |
| 4 | | 11.5 | 63 | |

Next referring to Table 4 the three fiber samples of Table 3 provided tensile strength data for the drawing conditions of Table 3. As Table 4 shows, the fibers of the present invention exhibited tensile strength as high as 14 g/denier and percent elongation as low as 6; both values being substantially better than those for polymer and glass fibers manufactured with prior art systems.

TABLE 4

| | Linear Density (den) | Max Load (gf) | Tenacity at Maximum (gf/den) | Tensile strain at Maximum (%) | Modulus (gf/den) | Energy at Max Load (gf-mm) |
|---|---|---|---|---|---|---|
| 1 | 12.00 | 167.52 | 13.96 | 16.7 | 136.13 | 4477.96 |
| 2 | 12.00 | 167.42 | 13.95 | 16.7 | 131.59 | 4530.95 |
| 3 | 12.00 | 169.01 | 14.08 | 16.7 | 147.74 | 4574.25 |
| Mean | 12.00 | 167.98 | 14.00 | 16.7 | 138.49 | 4527.72 |
| S.D. | 0.00 | 0.89 | 0.07 | 0.0 | 8.33 | 48.22 |
| C.V. | 0.00 | 0.53 | 0.53 | 0.0 | 6.02 | 1.07 |
| Minimum | 12.00 | 167.42 | 13.95 | 16.7 | 131.59 | 4477.96 |
| Maximum | 12.00 | 169.01 | 14.08 | 16.7 | 147.74 | 4574.25 |
| 1 | 10.00 | 110.57 | 11.06 | 18.3 | 112.40 | 3323.90 |
| 2 | 10.00 | 89.52 | 8.95 | 11.7 | 87.54 | 1557.03 |
| 3 | 12.00 | 96.27 | 8.02 | 13.3 | 71.52 | 1928.63 |
| Mean | 10.67 | 98.79 | 9.34 | 14.4 | 90.49 | 2269.85 |
| S.D. | 1.15 | 10.75 | 1.55 | 3.5 | 20.60 | 931.55 |
| C.V. | 10.83 | 10.88 | 16.64 | 24.0 | 22.76 | 41.04 |
| Minimum | 10.00 | 89.52 | 8.02 | 11.7 | 71.52 | 1557.03 |
| Maximum | 12.00 | 110.57 | 11.06 | 18.3 | 112.40 | 3323.90 |
| 1 | 12.00 | 114.86 | 9.57 | 6.7 | 167.74 | 1150.06 |
| 2 | 9.00 | 114.23 | 12.69 | 6.7 | 176.86 | 1081.01 |
| 3 | 9.00 | 130.84 | 14.54 | 8.3 | 240.54 | 1628.25 |
| Mean | 10.00 | 119.98 | 12.27 | 7.2 | 195.05 | 1286.44 |
| S.D. | 1.73 | 9.42 | 2.51 | 1.0 | 39.66 | 298.02 |
| C.V. | 17.32 | 7.85 | 20.46 | 13.3 | 20.33 | 23.17 |
| Minimum | 9.00 | 114.23 | 9.57 | 6.7 | 167.74 | 1081.01 |
| Maximum | 12.00 | 130.84 | 14.54 | 8.3 | 240.54 | 1628.25 |

Fiber produced by the method of the present invention was assessed for optical transmissivity based on the following protocol. An approximately 50 cm. length of fiber having an outer diameter of 710 micrometers was employed. The light sources used were an Ando model AQ-4303B white light source, an Ando model number AQ-4139 1310 nm laser source and an Ando model number AQ-4147 850 nm laser source. An Ando model number AQ-6310B optical spectrum analyzer and an Ando model number AQ-1125 power meter with Ando model number AQ-1950 and AQ-1951 heads were also used.

Figure 4:
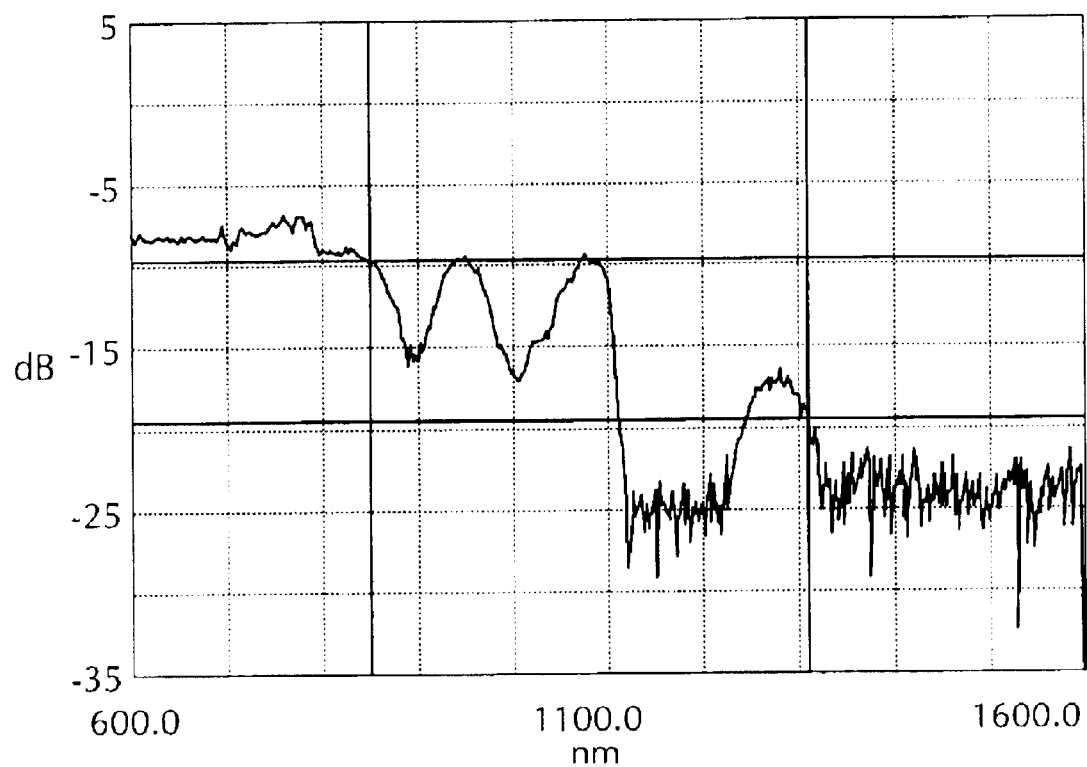
FIG. 4 is a first attenuation graph of the fiber of the present invention.

Initially, the fiber was analyzed without any fiber end preparation. The white light source was first directly coupled to the spectrum analyzer to obtain a reference graph. The fiber of the present invention was then inserted and measured. Subtraction of the reference graph from the resulting fiber graph is shown in FIG. 4. Vertical lines in FIG. 4 show attenuation values of 9.6 dB at 850 nm and 19.5 dB at 1310 nm, both important telecommunication wavelengths.

Next, the ends of the fiber were polished, and the above described laser light sources and power meter were employed for more accurate attenuation measurements. First, the laser light sources were directly coupled to the power meter by a glass fiber to obtain reference data.

Next, the fiber of the present invention was inserted in place of the glass fiber. The reference data was subtracted from the resulting fiber data. For the 850 nm wavelength, the fiber attenuation was 3.2 dB (−3.8 dBm (reference) −7. dBm (fiber)). For the 1310 nm wavelength, the fiber attenuation was 10.88 dB (−3.3 dBm (reference) −14.18 dBm (fiber)).

Figure 5:
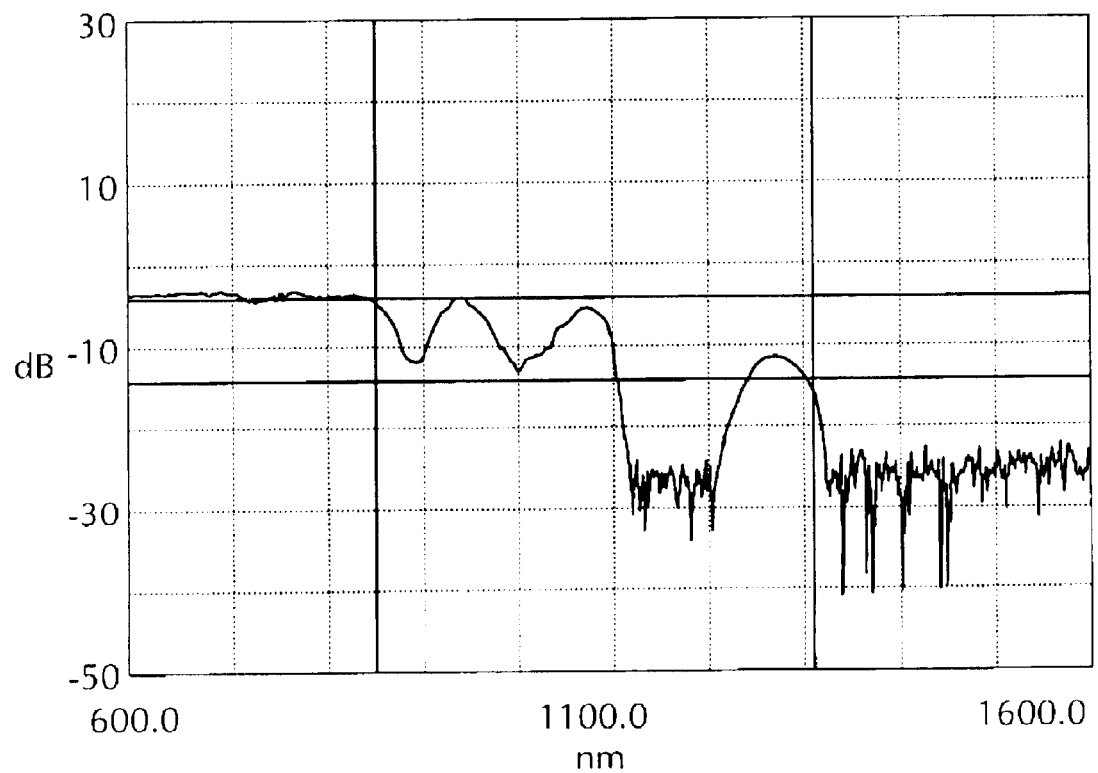
FIG. 5 is a second attenuation graph of the fiber of the present invention.
Figure 6:
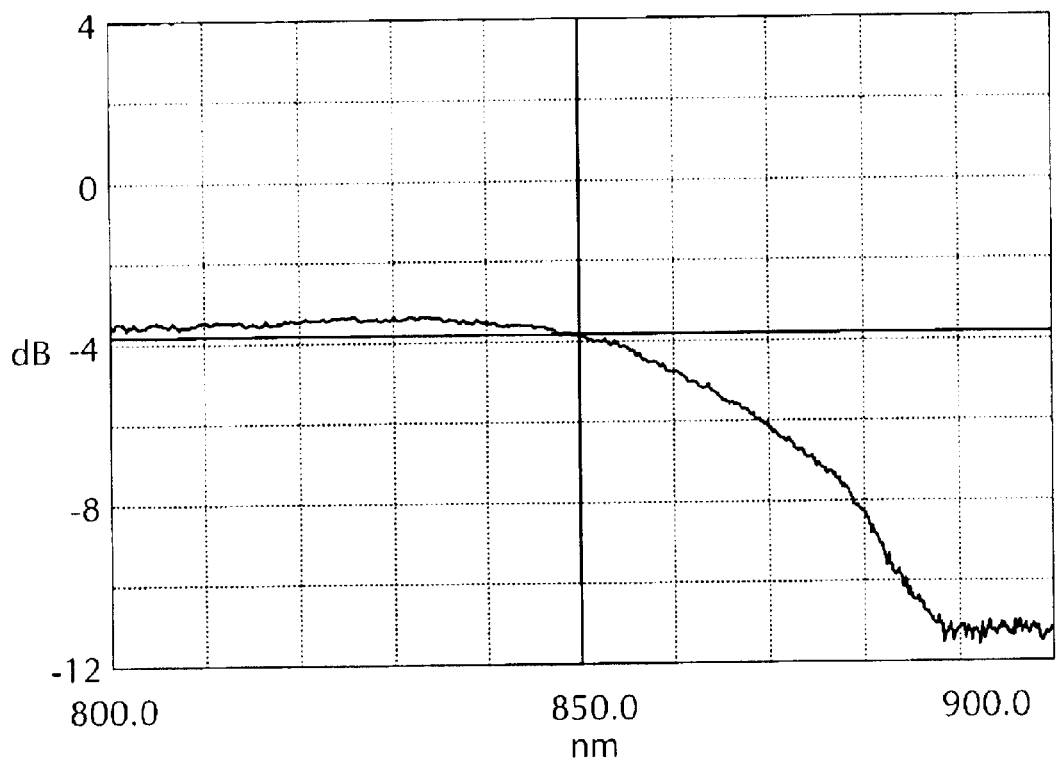
FIG. 6 is a close-up of FIG. 5 at 850 nm.
Figure 7:
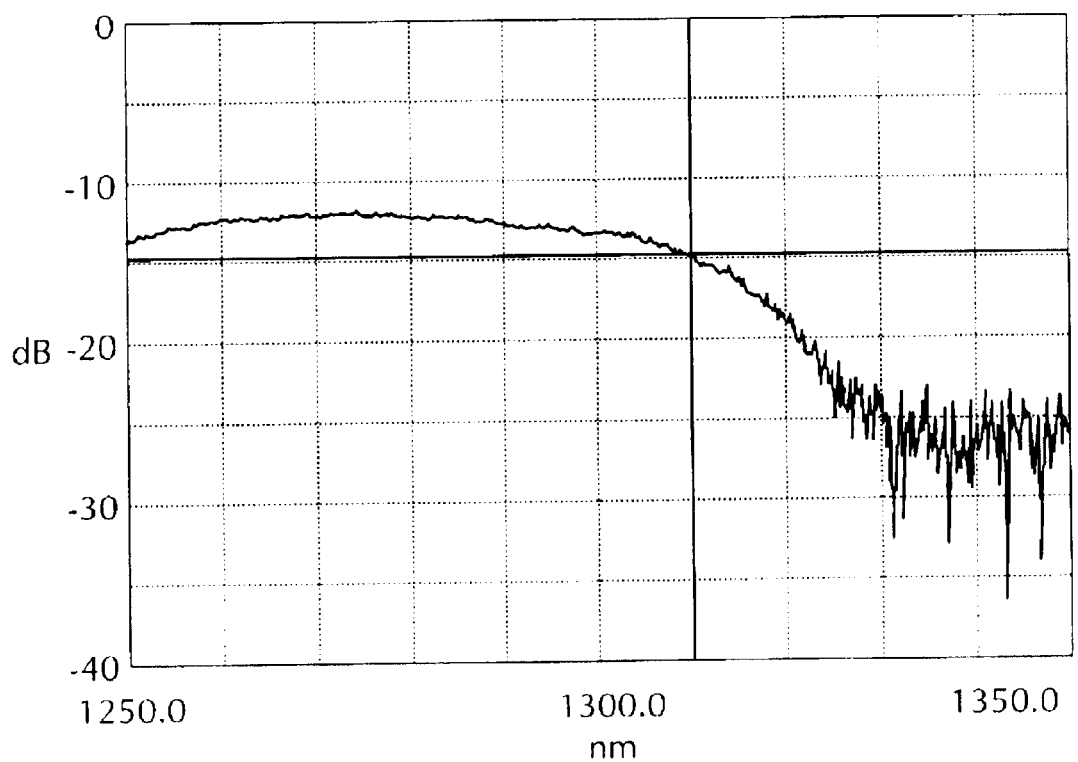
FIG. 7 is a close-up of FIG. 5 at 1310 nm.

Finally, the first white light analysis was repeated with fiber of the present invention having polished ends. FIGS. 5–7 show the attenuation results. FIG. 5 shows attenuation marked at both 850 nm and 1310 nm with vertical lines. FIG. 6 is a close-up of the 850 nm attenuation of FIG. 5. FIG. 7 is a close-up of the 1310 nm attenuation of FIG. 5.

Comparing the semi-crystalline optical fiber of the present invention to known semi-crystalline fibers shows that the known semi-crystalline polyethylene fibers pass essentially no light of measurable quantities at any wavelength, and specifically not at 850 nm and 1310 nm. Unlike the semicrystalline fibers of the present invention, the known semi-crystalline polyethylene fibers are useless as light conduits.

What is claimed is:

1. A transparent plastic optical fiber comprising an outer sheath and an inner core, wherein said inner core comprises a semi-crystalline polymer and wherein said semi-crystalline polymer is greater than 30% crystalline.

2. The optical fiber of claim 1, wherein said semi-crystalline polymer has an extended chain morphology at the core of said fiber.

3. The optical fiber of claim 1, wherein said semi-crystalline polymer has an extended crystalline structure at the core of said fiber.

4. The optical fiber of claim 1, wherein said semi-crystalline polymer is a homopolymer.

5. The optical fiber of claim 1, wherein said semi-crystalline polymer is a polyolefin.

6. The optical fiber of claim 1, wherein a majority of said inner core comprises a semi-crystalline polymer.

7. The optical fiber of claim 1, wherein said inner core consists essentially of a semi-crystalline polymer.

* * * * *